United States Patent [19]
Trussell et al.

[11] Patent Number: 5,257,275
[45] Date of Patent: Oct. 26, 1993

[54] MULTIPLE OUTPUT WAVELENGTH SOLID STATE LASER AND TECHNIQUE

[75] Inventors: C. Ward Trussell, Woodbridge; James A. Hutchinson, Lorton, both of Va.

[73] Assignee: The U.S. Government as represented by the Secretary of the Army, Washington, D.C.

[21] Appl. No.: 921,787

[22] Filed: Jul. 30, 1992

[51] Int. Cl.$^5$ .................................................. H01S 3/11
[52] U.S. Cl. ........................................... 372/23; 372/97
[58] Field of Search ........................ 372/23, 97, 69, 70

[56] References Cited

U.S. PATENT DOCUMENTS

| | | |
|---|---|---|
| 4,757,507 | 7/1988 | Wondrazek et al. ................. 372/23 |
| 5,022,041 | 6/1991 | Jacobs ................................... 372/70 |
| 5,084,890 | 1/1992 | Brierley ................................ 372/70 |

FOREIGN PATENT DOCUMENTS 4110189 10/1992 Fed. Rep. of Germany ........ 372/97

*Primary Examiner*—Georgia Y. Epps
*Attorney, Agent, or Firm*—Milton W. Lee; Alain L. Bashore; Anthony T. Lane

[57] ABSTRACT

A multiple output wavelength laser and technique for generating multiple output laser wavelengths from a solid state lasing material. The solid state material must be able to lase at multiple nonoverlapping transitions such that there are no losses due to gain competition or divided output power.

9 Claims, 1 Drawing Sheet

MULTIPLE OUTPUT WAVELENGTH SOLID STATE LASER AND TECHNIQUE

BACKGROUND OF THE INVENTION

1. Field of the Invention

The present invention generally relates to multiple output wavelength solid state lasers and more specifically, to a method and apparatus for exciting a multiple output wavelength solid state material to effect multiple nonoverlapping transitions providing simultaneous lasing at multiple transitions.

2. Description of Prior Art

Various types of lasers are known, which are classified according to their pumping or excitation scheme. The function of the pumping system is to maintain more atoms in the upper than the lower state, thereby assuring that stimulated emission, called gain will exceed absorption and losses. The wavelength at which the laser emits is dependent upon the particulars of the electronic transitions within the laser gain material. The particular emission wavelength is dependent on many factors including the amplifying medium, pump wavelength, and laser cavity mirrors. A desirable type of laser utilizes a solid state material as the amplifying medium since it generally requires relatively low pump energy for laser action and overall construction is more rugged for field deployment.

More than one wavelength is often desired which would require using two separate lasers, which obviously requires duplication of power supplies, optics, etc. Multiple wavelength laser emission is a more efficient solution that has been sought in the prior art, but that has problems. While the prior art has reported using non-solid state dual wavelength lasers none have established a basis for a specific apparatus that is dedicated to the task of resolving the particular problems at hand.

Two lasing media in the same oscillator have been used to generate two simultaneous output wavelengths. An example is the 193 nm and 248 nm output from a mixture of ArF and KrF in an eximer laser where each material lases separately. Mixtures of dyes can generate multiple wavelength output in dye lasers. Emission from separate stripes or layers in semiconductor lasers has been demonstrated, as has emission from separate dopants in rare earth doped crystals, and separate color centers in alkali halide crystals. These parallel media concepts require the sharing of pump energy, and are therefore of reduced efficiency.

Examples of dual laser emission from a single active medium usually involve emission from parallel transitions or up conversion, but these techniques often exhibit gain competition as demonstrated in laser dyes. Techniques in which different subsets of the lasing medium are lased have been demonstrated using for example polarization or half mirror isolation, but again the gain is divided between the separate laser wavelengths.

There is also known in the prior art the use of a gas laser for dual wavelength laser emission as disclosed by Akimoto and Brown in Optics Letters, July 1985, pages 333-334. This laser uses a dual wavelength HeNe laser, emitting on two "cascade" transitions. In this device, lasing at one wavelength actually enhances the output at the second transition, by increasing the population inversion of that transition. The system is however a gas laser, not a solid state laser.

What is needed in this instance is a multiple wavelength solid state laser technique where no reduced operating efficiencies because of the separate wavelengths.

SUMMARY OF THE INVENTION

It is therefore the main object of the invention to provide a multiple wavelength laser and technique that exhibits no reduced operating efficiencies between separate wavelengths and is a solid state laser.

According to the invention, there is disclosed a technique for emitting multiple wavelengths from a solid state laser. The lasing material may be any solid state material that can lase at two nonoverlapping transitions. A single active medium is used, such that there is no need to share pump energy among several gain materials. A "cascade" dual transition scheme is utilized and no losses due to gain competition or divided output power.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
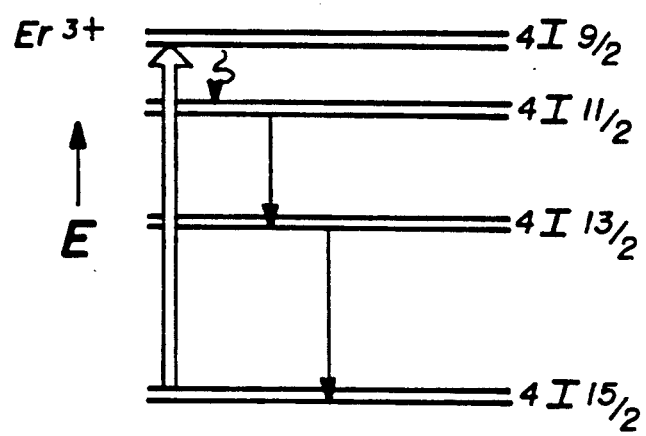
FIG. 1 is an energy-level diagram.

Referring now to the drawings, and more particularly to FIG. 1, there is shown the energy level diagram for the lasing ion Er 3+ which is the lasing material of the preferred embodiment. As shown in FIG. 1, the energy level transitions of $4I_{11/2}$ to $4I_{13/2}$ and $4I_{13/2}$ and $4I_{15/2}$ are lased simultaneously or sequentially. It is understood that this technique is not limited to the lasing material of the preferred embodiment. Any lasing material in the solid state that can lase at two or more non overlapping transitions may be utilized. A single active medium is used, and does not need to share pump energy among several gain materials. Being a "cascade" dual transition scheme, there are no losses due to gain competition or divided output power. As a solid state material, relatively low pump energy is required and more rugged construction for field deployment is possible.

Figure 2:
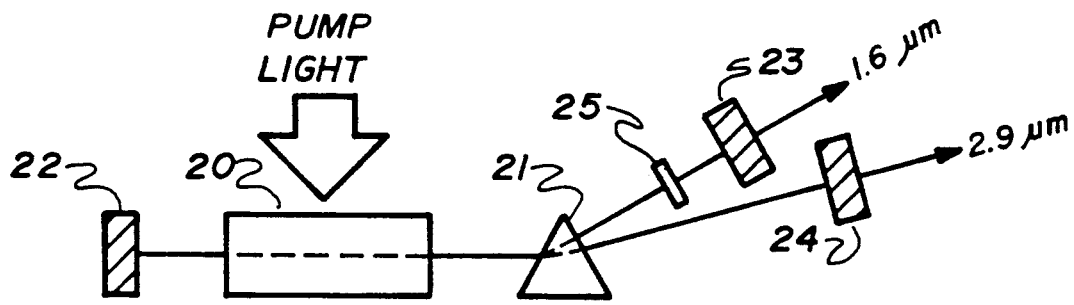
FIG. 2 is a block diagram of the preferred embodiment.

FIG. 2 shows the preferred embodiment for the arrangement of the laser utilizing the technique described above. A dual laser cavity scheme is shown where pump light irradiates lasing medium 20 which in this preferred embodiment is an Er 3+ doped laser rod, eventually populating the $4I_{11/2}$ excited state which lase approximately at 2-9 um by transition to the $4I_{13/12}$ state. The laser cavity for this transition consists of mirror 22, gain material 20, prism 21 and reflector 24. High reflecting mirror 22 and partial mirror 24 form a Fabry-Perot oscillator cavity which emits approximately 2.9 um laser light. Once there is sufficient population at the $4I_{11/2}$ level, high reflecting mirror 22, prism 21, gain material 20 and partial reflecting mirror 23 form a laser cavity that generates approximately 1.6 um laser light. Laser light at either or both wavelengths can be used, with no competition for the pump energy. Shutter means 25 is optionally included for sequential output. For the preferred embodiment, shutter means is a pockels cell but may be any type of shutter means.

Figure 3:
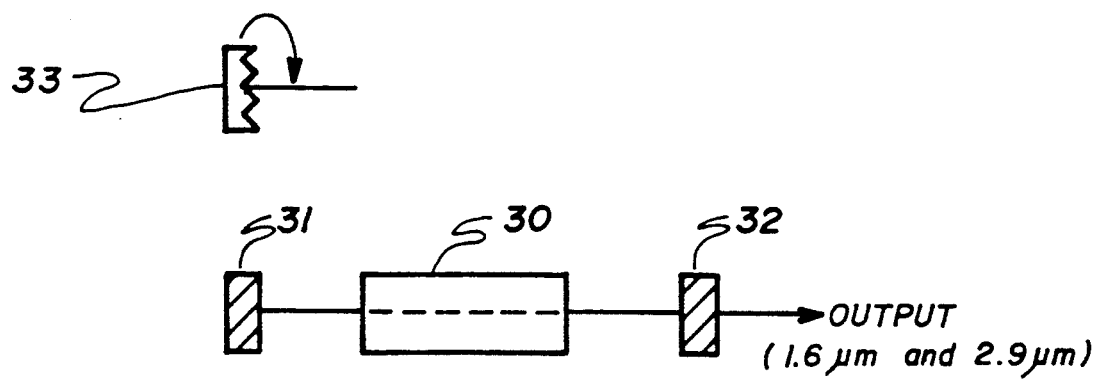
FIG. 3 is a block diagram of a second embodiment.

FIG. 3 shows an alternative embodiment where lasing medium 30 is again an Er 3+ laser doped rod. High reflecting mirror 31 and partial reflecting mirror 32 form a simple cavity that lases at both wavelengths simultaneously or sequentially and coaxially. Grating means 33 is optionally included in place of mirror 31 for sequential output. For this embodiment grating means 33 is a wavelength selective grating. The output coupler reflectivities at the two lasing wavelengths need simply to be tailored to the requirements of the particular lasing medium. It is understood that the invention is not limited to the number of cavities nor the number of wavelength outputs. For some materials, the output need not be limited to two wavelengths, but may consist of three or more wavelengths, depending upon the particulars of the lasing energy levels and dynamics.

While this invention has been described in terms of preferred embodiment consisting of the specific laser rod and designs of the preferred embodiment, those skilled in the art will recognize that the invention can be practiced with modification within the spirit and scope of the appended claims.

Having thus described my invention, what I claim as new and desire to secure by Letters Patent is as follows:

1. A multiple output wavelength laser emission technique comprising:

applying pump energy to a solid state lasing material having multiple energy level transitions;

populating multiple excited states of said lasing material in successive transitions;

emitting laser light at multiple wavelengths from at least one laser cavity such that there is no losses due to gain competition or a divided output power.

2. The technique of claim 1 wherein said successive transitions are $4I_{11/2}$ to $4I_{13/2}$ and $4I_{13/2}$ to $4I_{15/2}$ lased simultaneously for an Er 3+ ion.

3. The technique of claim 2 wherein said wavelengths are approximately 2.9 and 1.6 um.

4. The technique of claim wherein said output emission is simultaneous.

5. The technique of claim 1 wherein said output emission is sequential.

6. A multiple output wavelength laser comprising:

at least one cavity means to define a laser oscillator;

a solid state lasing material within said cavity means having a characteristic of multiple nonoverlapping transition energy levels;

means for pumping said lasing material to irradiate said material such that simultaneous lasing due to transitions between different levels emits multiple separate wavelengths whereby there is no loss due to gain completion or a divided output power.

7. The laser of claim 6 wherein said solid state lasing material is an Erbium 3+ ion doped laser rod.

8. The laser of claim 6 wherein said cavity means further defines two cavities.

9. The laser of claim 6 wherein one of said cavities is a Fabry-Perot oscillator cavity.

* * * * *